United States Patent
Shao et al.

(10) Patent No.: US 10,133,698 B2
(45) Date of Patent: Nov. 20, 2018

(54) HOT-PLUG CAPABLE INPUT AND OUTPUT (IO) SUBSYSTEM

(71) Applicant: Baidu USA LLC, Sunnyvale, CA (US)

(72) Inventors: Wesley Shao, Cupertino, CA (US); Ji Li, San Jose, CA (US); Junwei Bao, Los Altos, CA (US); Weiyu Wendy Lu, Fremont, CA (US)

(73) Assignee: BAIDU USA LLC, Sunnyvale, CA (US)

(*) Notice: Subject to any disclaimer, the term of this patent is extended or adjusted under 35 U.S.C. 154(b) by 227 days.

(21) Appl. No.: 15/019,822

(22) Filed: Feb. 9, 2016

(65) Prior Publication Data
US 2017/0228339 A1  Aug. 10, 2017

(51) Int. Cl.
| | |
|---|---|
| *G06F 1/18* | (2006.01) |
| *G06F 13/40* | (2006.01) |
| *G06F 13/10* | (2006.01) |
| *G06F 13/20* | (2006.01) |
| *G06F 13/42* | (2006.01) |

(52) U.S. Cl.
CPC .......... *G06F 13/4081* (2013.01); *G06F 1/185* (2013.01); *G06F 13/102* (2013.01); *G06F 13/20* (2013.01); *G06F 13/4282* (2013.01)

(58) Field of Classification Search
CPC ...... G06F 13/4081; G06F 1/184–1/188; G06F 13/102; G06F 13/20; G06F 13/4282
USPC .................................................... 439/607.29
See application file for complete search history.

(56) References Cited

U.S. PATENT DOCUMENTS

| | | | | |
|---|---|---|---|---|
| 5,436,800 A | * | 7/1995 | Maruska ................. | G06F 1/184 211/41.17 |
| 5,460,441 A | * | 10/1995 | Hastings ................. | G06F 1/184 312/138.1 |
| 5,461,717 A | * | 10/1995 | Notarianni ............ | G06F 1/1632 361/727 |
| 5,519,577 A | * | 5/1996 | Dudas .................. | H05K 1/0218 174/350 |
| 5,831,821 A | * | 11/1998 | Scholder ................. | G06F 1/184 361/679.32 |

(Continued)

OTHER PUBLICATIONS

PCI Express Base Specification Revision 3.0 Nov. 10, 2010 (Year: 2010).*

*Primary Examiner* — Paul R. Myers
(74) *Attorney, Agent, or Firm* — Womble Bond Dickinson (US) LLP

(57) ABSTRACT

An IO subsystem chassis includes IO modules and IO slots to receive the IO modules inserted from a frontend of a housing, a baseboard disposed within the housing, the baseboard including first connectors corresponding to the IO slots to receive and connect the IO modules. Each of the IO modules can be coupled a server via the backend panel using a cable. Each IO module includes an IO card having a peripheral device mounted thereon and a card holder having a first receiving socket to receive and hold the IO card plugged in vertically and downwardly. The card holder further includes a second connector to engage with or disengage from a corresponding one of the first connectors of the baseboard horizontally, when the IO module is inserted into or removed from a corresponding IO slot from the frontend, without having to removing the housing.

32 Claims, 8 Drawing Sheets

(56) References Cited

U.S. PATENT DOCUMENTS

| | | | | |
|---|---|---|---|---|
| 5,863,211 | A * | 1/1999 | Sobotta | G06F 1/184 361/735 |
| 6,014,319 | A * | 1/2000 | Kuchta | G06F 1/184 361/788 |
| 6,025,989 | A * | 2/2000 | Ayd | G06F 1/183 312/236 |
| 6,297,962 | B1 * | 10/2001 | Johnson | H05K 7/1421 248/535 |
| 6,466,448 | B1 * | 10/2002 | Baik | G06F 1/183 361/752 |
| 6,483,709 | B1 * | 11/2002 | Layton | H05K 7/1454 361/679.4 |
| 6,741,463 | B1 * | 5/2004 | Akhtar | G06F 1/1632 312/223.1 |
| 8,756,360 | B1 | 6/2014 | Richard | |
| 9,232,677 | B2 * | 1/2016 | Rauline | H05K 7/1489 |
| 9,653,124 | B2 * | 5/2017 | Heyd | G11B 33/128 |
| 9,817,450 | B2 * | 11/2017 | Zani | G06F 1/185 |
| 2003/0002261 | A1 * | 1/2003 | Berry | H05K 7/1489 361/727 |
| 2003/0046452 | A1 * | 3/2003 | Andrewartha | G06F 1/181 710/2 |
| 2003/0051166 | A1 * | 3/2003 | Garnett | G06F 1/183 726/15 |
| 2003/0117782 | A1 * | 6/2003 | Wrycraft | H05K 5/00 361/752 |
| 2005/0258243 | A1 * | 11/2005 | Hsieh | G06K 7/0047 235/441 |
| 2007/0076366 | A1 * | 4/2007 | Makabe | G06F 1/185 361/679.39 |
| 2008/0101007 | A1 * | 5/2008 | Tsorng | G06F 1/187 361/679.33 |
| 2008/0259555 | A1 * | 10/2008 | Bechtolsheim | G06F 13/409 361/679.4 |
| 2010/0254096 | A1 * | 10/2010 | Kim | G06F 1/185 361/737 |
| 2011/0261526 | A1 * | 10/2011 | Atkins | G06F 1/187 361/679.33 |

* cited by examiner

US 10,133,698 B2

HOT-PLUG CAPABLE INPUT AND OUTPUT (IO) SUBSYSTEM

FIELD OF THE INVENTION

Embodiments of the present invention relate generally to electronic racks of data centers. More particularly, embodiments of the invention relate to a hot-plug capable input and output (IO) subsystem of an electronic rack.

BACKGROUND

There have been efforts of adding hot-plug capability to computer servers. Since in general it is difficult to ascertain the hot-plug requirement and usage of each server at the time of design, adding hot-plug hardware to each PCIe slot in the system (e.g., 4-8 slots per server) is costly even though only one or two slots will be occupied. Most servers do not run with any plugin card. A plugin card may also have a different form factor than the one a server provides. For example, a server may only provide half height Peripheral Component Interconnect (PCI) Express (PCIe) slots hence incapable of handling full height PCIe cards.

Usually one or more PCIe switches are deployed in a computer chassis. Since a conventional PCIe fabric only allows a single root complex, each chassis can only be connected to one server. In order to upgrade (e.g., from one PCIe generation to another generation) to new PCIe switches, all components within the chassis (e.g., a motherboard and/or card hosting the PCIe switch and slot, a management processor) need to be replaced. This is mostly due to all the components are tested and bound to the PCIe switch. Such a configuration is not flexible and cost inefficient.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1A:
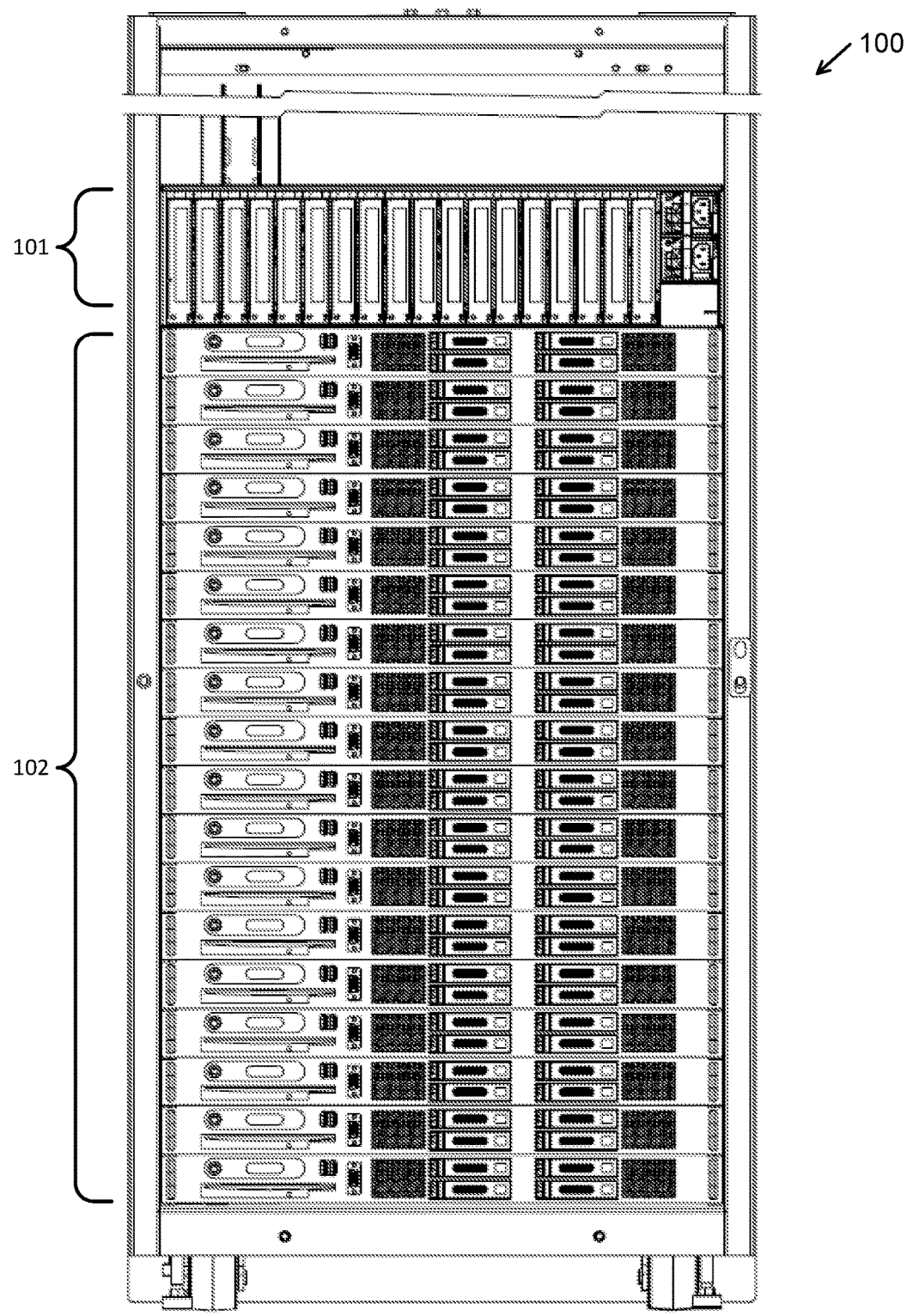
FIGS. 1A-1B are block diagrams illustrating an electronic rack of servers, which may be used in a data center according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments of the invention, an IO subsystem chassis is utilized to host IO plugin cards (e.g., PCIe cards). Each card can be individually hot inserted into or hot removed from the chassis. Each card can be individually connected to a server of a server chassis of an electronic rack via a cable that is compatible with the signaling protocol of the corresponding IO plugin card. The IO subsystem chassis includes thermal components (e.g., fans and air duct), a power supply, and necessary management circuitry that monitors and manages the environment. Hot-plug hardware is compliant to the PCI hot-plug specification, including Attention LED, Attention button, Power LED, etc. A mechanical module (e.g., a device holder or adapter) is utilized to host an individual PCIe plugin card. An IO module can be hot plugged into the chassis through matching mating connectors between the IO module and chassis. A circuit board is utilized to convert the signals between the PCIe plugin card and cable connectors, which is mounted inside the chassis. Note that throughout this application a PCIe card is utilized as an example of an IO card or peripheral device. However, the techniques described herein can also be applicable to other types of IO or peripheral devices, such as PCI devices, PCI-X devices, universal serial bus (USB) devices, and so on.

In one embodiment, an IO subsystem chassis includes one or more IO modules and a housing having a frontend and a backend. The housing or container contains multiple IO slots to receive the IO modules inserted from the frontend of the housing. The IO subsystem chassis further includes a baseboard disposed within the housing. The baseboard includes an array of first connectors corresponding to the IO slots to receive and connect the inserted IO modules. Each of the IO modules can be coupled to a server via a backend panel using a cable. Each of the IO modules includes an IO card having a peripheral device mounted thereon and a card holder having a first receiving socket to receive and hold the IO card plugged in vertically and downwardly. The card holder further includes a second connector to engage with or disengage from a corresponding one of the first connectors of the baseboard horizontally, when the IO module is inserted into or removed from a corresponding IO slot from the frontend, without having to remove the housing.

According to a further embodiment, an IO module includes an IO card having a peripheral device mounted thereon and a card holder having a first connector and a second connector disposed thereon. The first connector is disposed as a receiving socket in a horizontal orientation to receive and hold the IO card that is plugged in vertically and downwardly. The second connector of the card holder that is holding the IO card together is to horizontally engage with or disengage from a third connector disposed on a baseboard of an IO subsystem chassis, when the IO module is inserted into or removed from one of the IO slots from a frontend of the IO subsystem chassis, without having to remove a housing that houses the IO modules therein. The IO subsystem chassis is disposed within an electronic rack having a server chassis coupled to the IO modules of the IO subsystem chassis via cables. The sever chassis includes a plurality of server blades, each server blade representing a server.

According to one embodiment, an electronic rack, which may be part of a data center, includes a server chassis having multiple server blades. Each server blade includes one or more processors, a memory, and/or local storage (e.g., persistent storage devices such as hard disks), and each server blade represents a server. The electronic rack further includes at least one of the IO subsystem chassis described above. The IO modules of the IO subsystem chassis are coupled to the server blades of the sever chassis using cables.

Figure 1B:
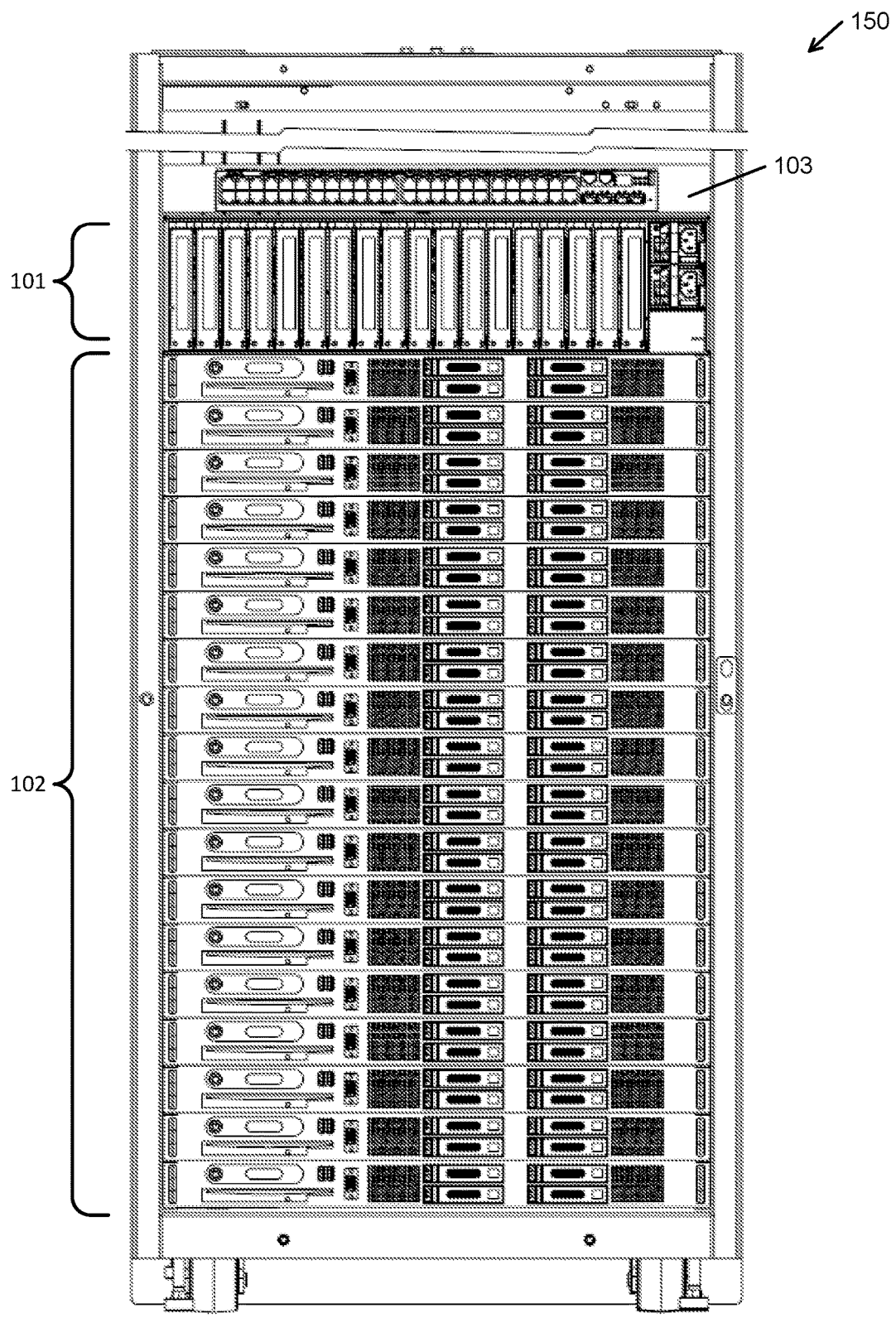

FIGS. 1A and 1B are diagrams illustrating examples of electronic racks according to certain embodiments of the invention. Referring to FIG. 1A, according to one embodiment, FIG. 1A shows a front view of electronic rack 100. Electronic rack 100 includes an IO subsystem chassis 101 and a server chassis 102. IO subsystem chassis 101 includes an array of IO modules inserted therein, for example, in a vertical orientation inserted from the frontend of IO subsystem chassis 101. Similarly, server chassis 102 includes an array of server blades inserted therein, for example in a horizontal orientation inserted from the frontend of server chassis 102.

Each of the IO modules of IO subsystem chassis 101 can be coupled to any one of the server blades of server chassis 102 using a cable (e.g., a PCIe link cable) that is electrically compatible with a signal protocol associated with the corresponding IO device mounted within the IO module. Each of the server blades of server chassis 102 can be coupled to one or more of the IO modules of IO subsystem chassis 101. An IO module can be coupled to a server blade using a cable arranged on a frontend of electronic rack 100 from a backend of electronic rack 100. In one embodiment, a cable coupling an IO module of IO subsystem 101 is coupled to a backend of the IO subsystem chassis 101 and a frontend of the server chassis 102 using a cable runway or a cable tunnel that extends between the frontend and backend of electronic rack 100.

According to one embodiment, each of the IO modules can be inserted into or removed from IO subsystem chassis 101 via the frontend without having to remove IO subsystem chassis 101 from electronic rack 100 or remove a housing of IO subsystem chassis 101 that houses the IO modules therein. That is, each of the IO modules can be dynamically inserted into or removed from (e.g., hot-plug) IO subsystem chassis 101. As a result, individual IO modules and server blades can be replaced, repaired, and/or upgraded without having a significant impact on the operations of remaining components of electronic rack 100.

One of the advantages of such a configuration is that a user can configure and connect any of the IO modules to any of the server blades from the frontend of the electronic rack. Typically, the backend of the electronic rack may include other auxiliary components (e.g., thermal components such as cooling fans) mounted thereon. As a result, it may be inconvenient to access the IO modules and/or the server blades from the backend of the electronic rack.

FIG. 1B shows an alternative embodiment of an electronic rack. Referring to FIG. 1B, in addition to IO subsystem chassis 101 and server chassis 102, electronic rack 150 further includes a network switch 103 (e.g., Ethernet switch or hub) to allow any of the IO modules and/or server blades to connect to a network, which may be an internal network (e.g., for management purposes), an external network (e.g., Internet), or a combination thereof.

According to one embodiment, each server blade of server chassis 102 includes one or more processors, a memory, and/or local storage (e.g., persistent storage devices such as hard disks), and each server blade represents a server (e.g., a Web server, a cloud server, an application server, or a backend server). One of the advantages of separating the IO modules and server blades in separate chassis is that the server blades and the IO modules can be independently managed, repaired, and/or upgraded, without significantly affecting the other chassis. In addition, a chassis typically provides centralized power, thermal and cooling management. The PCIe plugin cards may exceed the power limit (e.g., 25 watts) of regular PCIe specification and may not work well within a server chassis due to power consumption. By separating an IO subsystem chassis from a server chassis, the chassis design may also adapt to certain rack configurations, where the cooling and power can be delivered externally, e.g., centralized fan wall, rack level DC power, either by relying on or work in concert with the external components. Due to improved cooling environment, PCIe plugin cards designed specifically for such a chassis may omit active cooling components, such as fans, and instead use passive heat sinks, thus improving reliability.

When an IO subsystem represented by IO subsystem chassis 101 is a PCIe subsystem, according one embodiment, each of the server blades in server chassis 102 may include a PCIe root complex and/or at least one PCIe hub or switch device to allow a PCIe module of IO subsystem chassis 101 having a PCIe device therein to be connected to the server blade from its respective PCIe subsystem chassis using a PCIe link cable. In such a configuration, a PCIe module may include one PCIe device as a PCIe endpoint, without including a PCIe hub/switch or PCIe root complex. Alternatively, a PCIe module may further include a PCIe hub/switch device and multiple PCIe devices as PCIe endpoints. The PCIe devices are coupled to downlink ports of the PCIe hub/switch device, while an uplink port of the PCIe hub/switch device is coupled to a PCIe root complex or another PCIe hub/switch device in one of the server blades in server chassis 102. In such a configuration, multiple PCIe endpoints or functions can be implemented within a single PCIe module. Other configurations may exist.

Figure 2:
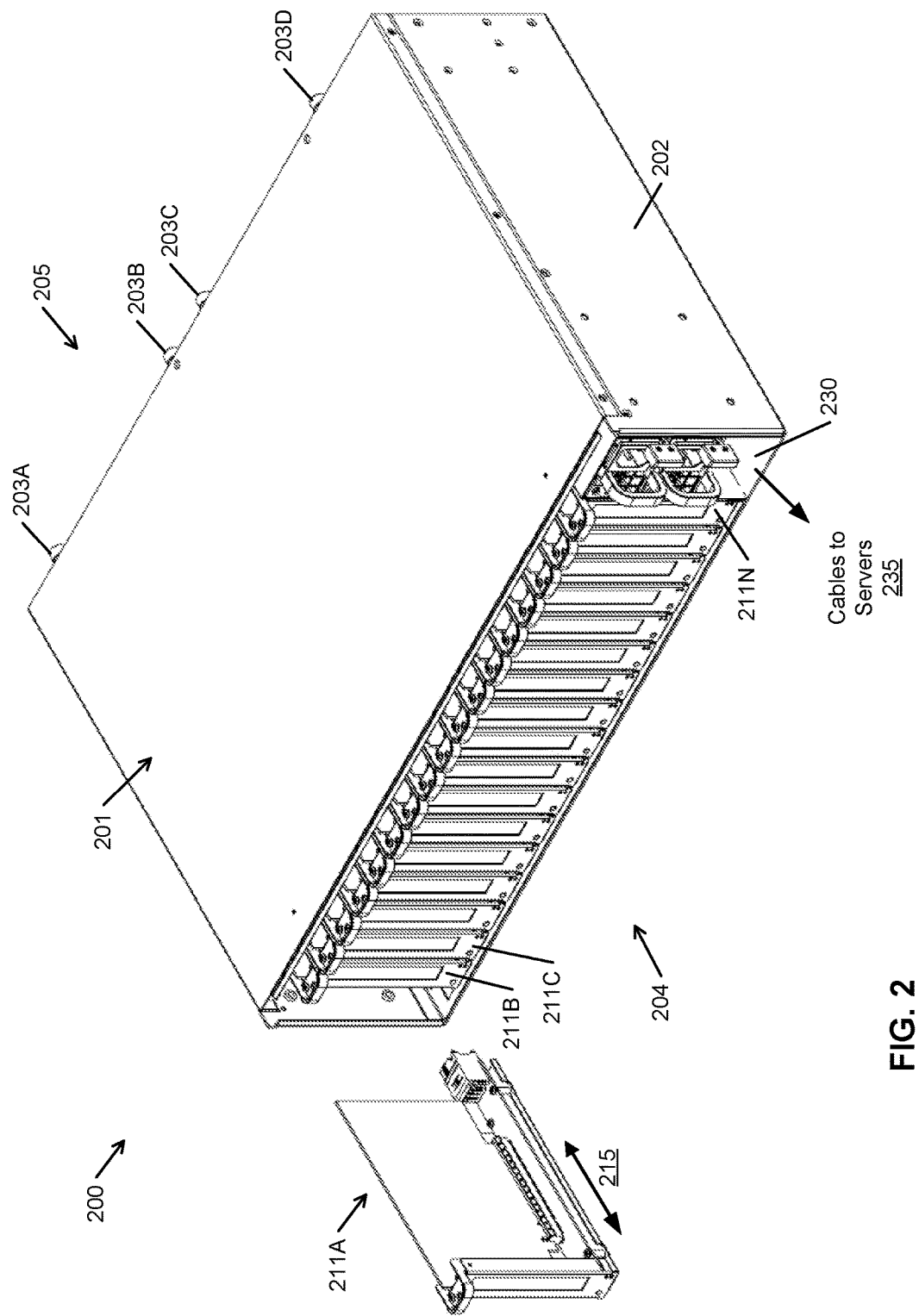
FIG. 2 is a perspective view of an example of an IO subsystem chassis according to one embodiment of the invention.

FIG. 2 is a perspective view of an example of an IO subsystem chassis according to one embodiment of the invention. IO subsystem 200 may be implemented as part of IO subsystem 101 of FIGS. 1A and 1B. Referring to FIG. 2, in one embodiment, IO subsystem 200 includes a housing having a top panel 201 and a U-shape panel 202, where top panel 201 may be attached to the U-shape panel 202 using one or more screws such as screws 203A-203D, forming a housing or container with a frontend 204 and a backend 205. The housing is configured to house, contain, or enclose an array of IO modules 211A-211N in an array of IO slots disposed therein. IO modules 211A-211N can be inserted into or removed from respective IO slots configured within the housing, as indicated in directions 215, via frontend 204 of the housing.

In one embodiment, IO modules 211A-211N can be inserted into or removed from the IO slots of the housing without having to remove at least top panel 201 of the housing. As described above, one or more of IO subsystem chassis 200 can be stacked in an electronic rack, as well as at least one server chassis, such as server chassis 102 as shown in FIGS. 1A-1B. In a conventional IO subsystem, the entire IO subsystem chassis has to be removed from the electronic rack and the housing of the IO subsystem chassis has to be removed in order to unplug an IO subsystem module. With the configuration as shown in FIG. 2, an IO module can be hot-plugged into or hot-unplugged from an IO slot of IO subsystem chassis 200, while IO subsystem chassis 200 is still stacked in an electronic rack. The IO module can be inserted into or removed from the corresponding IO slot without having to remove the housing of the IO subsystem chassis. One of the advantages of such a configuration is that if an individual IO module malfunctions, that particular IO module can be removed by pulling the IO module out of and away from frontend 204 IO subsystem chassis 200, without significantly affecting the operations of remaining IO modules of IO subsystem chassis 200.

In one embodiment, cables coupling IO subsystem modules 211A-211N may be coupled to respective connectors disposed on a baseboard (also referred to as a base panel, a base plate, or a base plane) of IO subsystem chassis 200 (not shown), which will be described in details further below. A set of cables 235, such as PCIe link cables, may connect IO modules 211A-211N via the baseboard and through cable runway 230 to respective server blades of a server chassis (e.g., server chassis 102) from the frontend of the electronic rack.

Figure 3A:
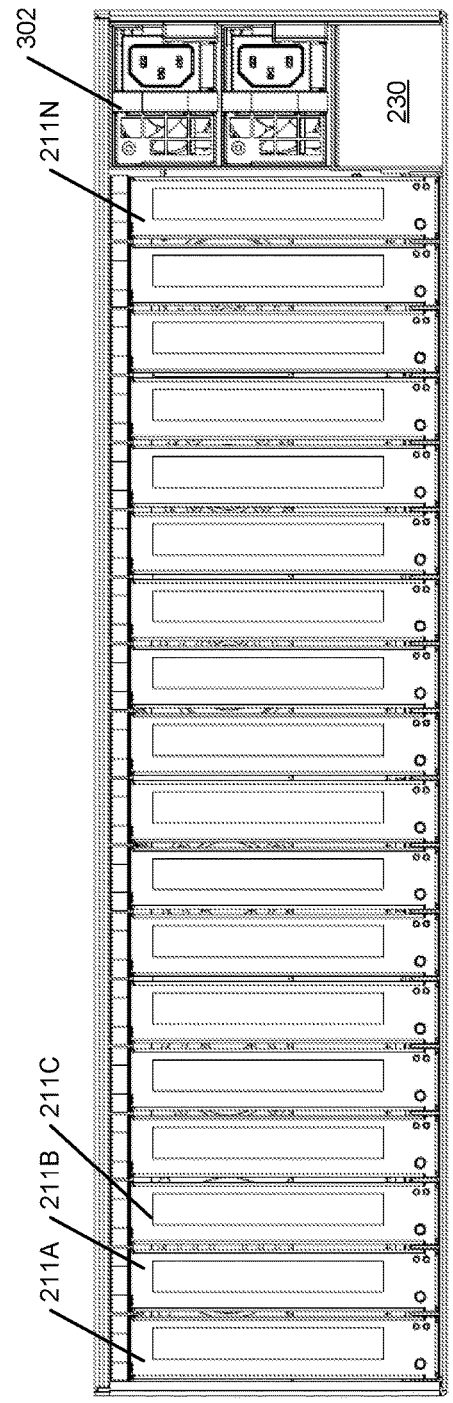
FIGS. 3A-3B show a front view and a back view of an IO subsystem chassis according to certain embodiments of the invention.
Figure 3B:
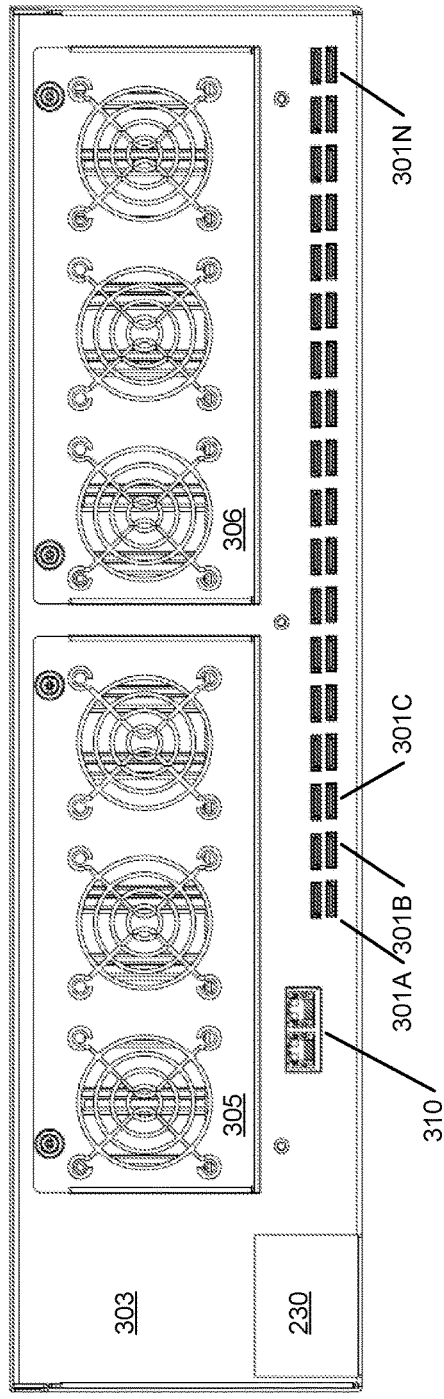

FIGS. 3A-3B show a front view and a back view of an IO subsystem chassis according to certain embodiments of the invention. Referring to FIGS. 3A-3B, IO subsystem chassis 200 further includes a power supply module 302 inserted in a power module slot. However, power supply module 302 only occupies a portion of the power module slot, in this example, an upper portion of the power module slot, which forms a cable runway or cable tunnel 230 extended between the frontend and the backend of IO subsystem chassis 200. On the backend, there one or more cooling fans 305-306 mounted on a back panel 303 of the IO subsystem chassis 200 to provide cooling to IO modules 211A-211N.

In addition, an array of cable connectors 301A-301N is mounted on back panel 303 of IO subsystem 200. Each of connectors 301A-301N is coupled to one of IO modules 211A-211N via a baseboard disposed within the chassis (not shown), when they are inserted into the corresponding IO slots. A set of link cables (e.g., PCIe link cables) can be plugged into connectors 301A-301N and connect to corresponding connectors disposed on server blades of a server chassis. In one embodiment, the link cables can reach the frontend of the IO subsystem chassis 200 via cable runway or cable tunnel 230 to connect with the frontend of server blades of the server chassis. Furthermore, one or more network connectors 310 (e.g., Ethernet connectors) are mounted on back panel 303, which may be coupled to a network switch or router, such as switch 103 of FIG. 1B, via a network cable (e.g., Ethernet cable). Network connectors are coupled to at least some of IO modules 211A-211N to allow a user or an administrator to access the IO modules 211A-211N, for example, for maintenance, configuration, and/or management operations of IO modules 211A-211N over a network. In one embodiment, connectors 301A-301N may be Oculink™ compatible connectors.

Figure 4A:
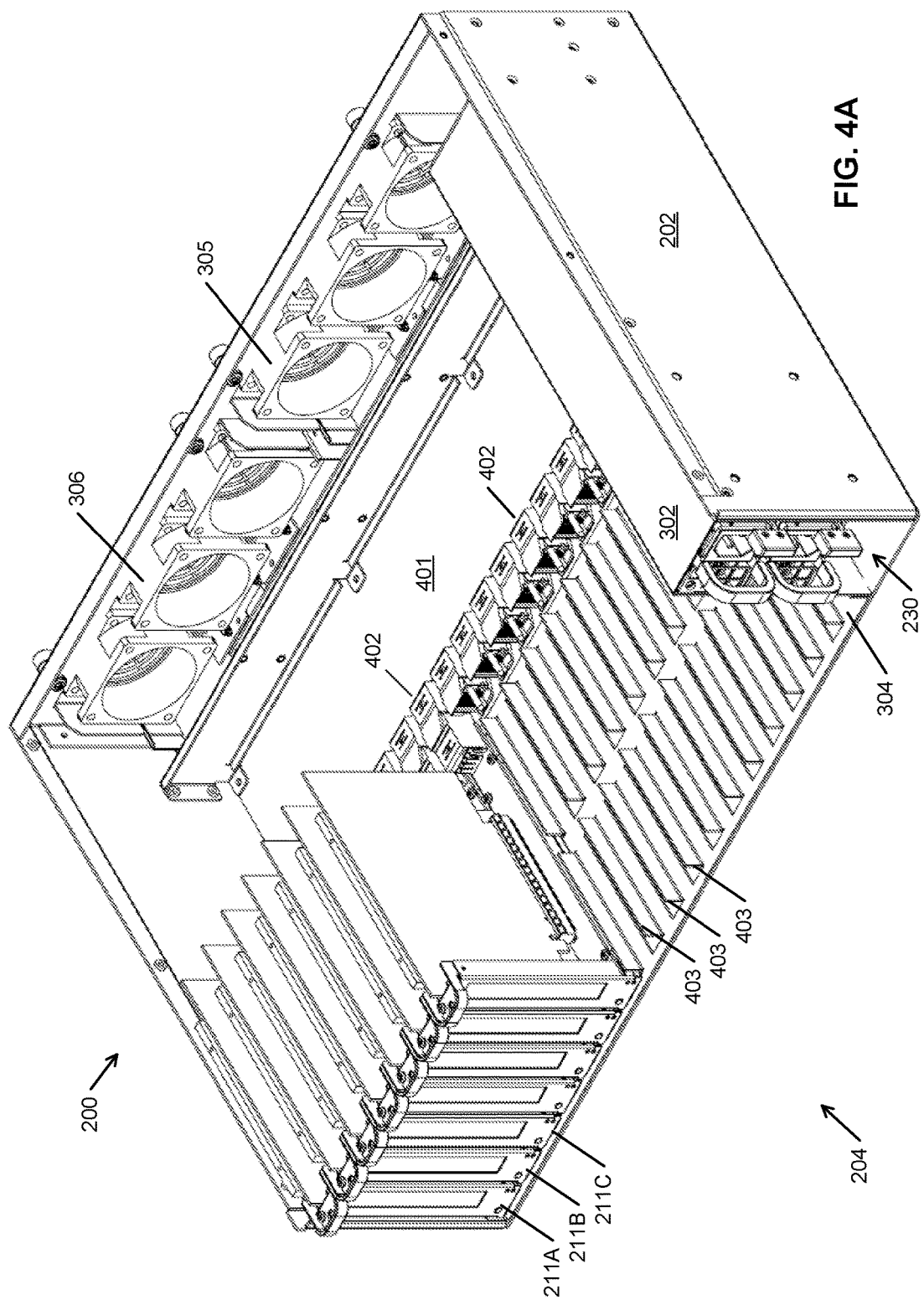
FIGS. 4A-4B show a perspective view of an IO subsystem chassis according to one embodiment of the invention.
Figure 4B:
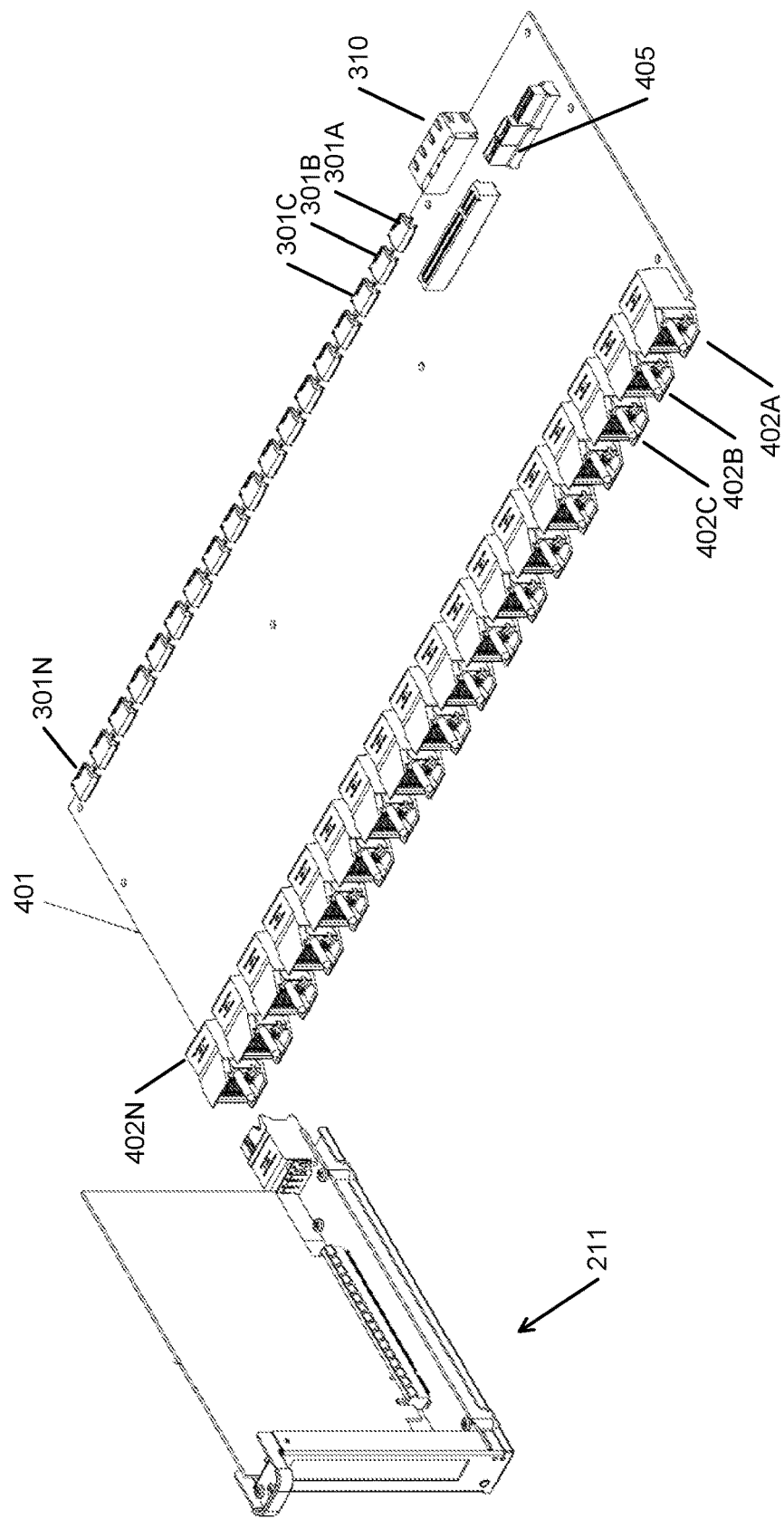

FIGS. 4A-4B show a perspective view of an IO subsystem chassis according to one embodiment of the invention. FIG. 4A shows a partially open perspective view of IO subsystem chassis 200. Referring to FIGS. 4A-4B, IO subsystem chassis 200 includes a baseboard 401 disposed within the housing of the chassis. The baseboard 401 includes an array of connectors such as connectors 402A-402N (also collectively referred to as connectors 402) disposed on a front edge of baseboard 401. Each of the connectors correspond to one of the IO modules 211 to receive the corresponding IO module inserted therein. In one embodiment, baseboard 401 is mounted on bottom panel 304 of the housing in a horizontal orientation, such that baseboard 401 would not significantly block or disturb an air flow generated by cooling fans 305-306 mounted on the back panel of the housing.

As shown in FIG. 4A, the cooling air flow can flow above baseboard 401 to reach the air space between IO modules 211 to lower the temperature of IO modules 211. As a result, an IO module may not need a local cooling fan mounted on the IO device. Rather, a heat sink (not shown) can be utilized. In one embodiment, baseboard 401 includes a printed circuit board (PCB) or circuitry to convert electrical signals between connectors 402A-402N and connectors 301A-301N according to a signaling protocol or specification (e.g., PCIe specification) associated with the IO devices of IO modules 211A-211N. In this example, connectors 301A-301N may be mounted on a back edge of baseboard 401, and exposed to outside of the chassis via the corresponding opening or cutout on the back panel of the chassis. Baseboard 401 further includes one or more power connectors 405 to connect with power supply module 302 using a power cable to provide power to IO modules 211A-211N.

In one embodiment, bottom panel 304 of the housing is configured to form an array of IO slots 403 to allow the corresponding IO modules 211A-211N (also collectively referred to as IO module or modules 211) to insert or slide into the housing from frontend 204 of the housing. Each of the IO slots may be defined using a fin or a sliding guide disposed on bottom panel 304 to guide or align the corresponding IO module to slide in and out. In one embodiment, as shown in FIG. 4A, the IO slots may be formed by cutting a U-shape opening from bottom panel and bending or tilting a fin as a result of the cutting upwardly in a substantially right angle with respect bottom panel 304. The tilted-up fin forms a sliding guide of the corresponding IO slot to guide an IO module to slide into the IO slot and align and connect with a corresponding connector (e.g., connector 402) of baseboard 401.

Figure 5A:
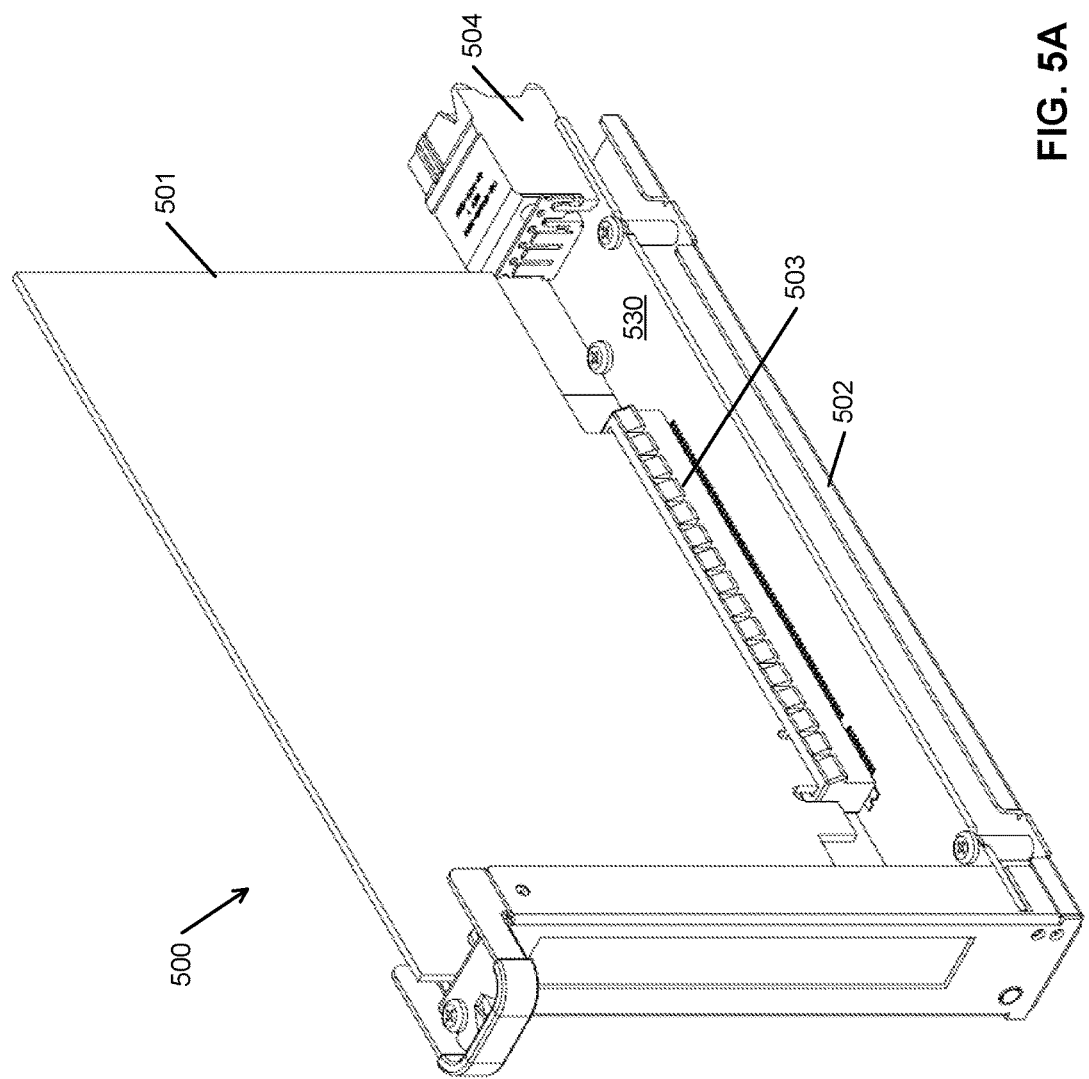
FIGS. 5A-5B show a perspective view and an explosive view of an IO module according to certain embodiments of the invention.
Figure 5B:
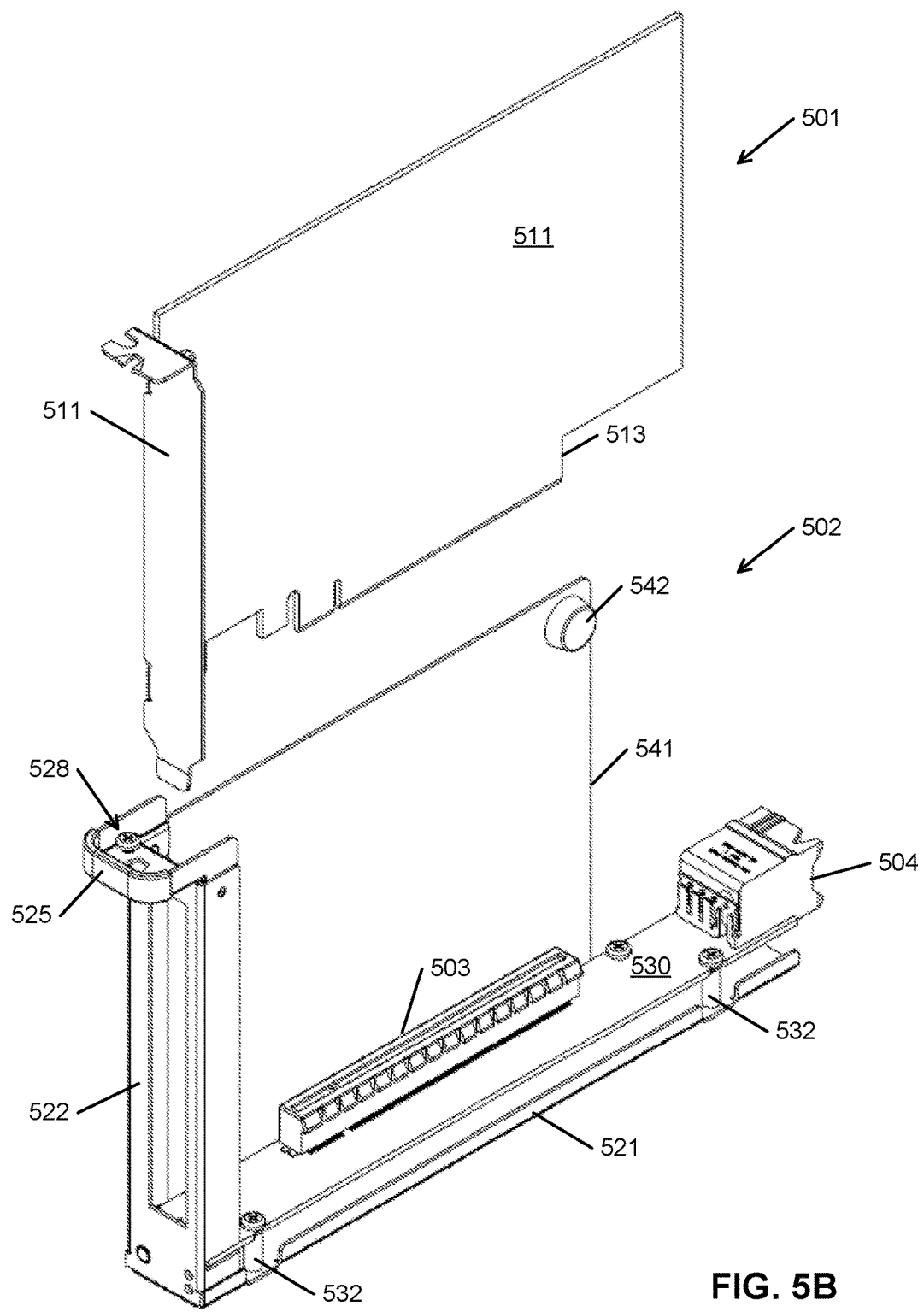

FIGS. 5A-5B show a perspective view and an explosive view of an IO module according to certain embodiments of the invention. IO module 500 may represent any of IO modules 211A-211N described above. Referring to FIGS. 5A-5B, IO module 500 includes an IO card 501 mounted on a card holder 502 (also referred to as an adapter, a retainer, or a placeholder). In one embodiment, card holder 502 includes a receiving socket 503 to receive IO card 501 to be plugged in vertically and downwardly as shown in FIG. 5B. Card holder 502 further includes a connector 504 mounted on a rear end of card holder 502. Before IO module 500 is inserted into an IO slot of the chassis, IO card 501 is mounted onto card holder 502 by inserting IO card 501 into receiving socket 503 to form IO module 500. IO module 500 having both IO card 501 and card holder 502 mounted together is then inserted into the IO slot. In one embodiment, when IO module 500 is inserted into one of the IO slots 403 of FIG. 4A, connector 504 is to engage or mate with a corresponding one of connectors 402. IO module 500 can be removed from the IO slot by pulling IO module 500 outwardly and away from the IO slot, during which connector 504 is disengaged from the corresponding one of connectors 402 of the IO slot.

Note that although not shown, any of peripheral devices can be mounted on IO card 501. As described above, dependent upon the specification, one or more peripheral devices can be mounted on IO card 501. A peripheral device can be a variety of peripheral devices, including but not limited to, a network interface device, a storage interface device, a field programmable gate array (FPGA) device, a graphic processing unit (GPU), a flash drive, or any other proprietary or customized devices. For example, a peripheral device mounted on IO card 501 can be a PCI/PCI-X/PCIe compatible device. In one embodiment, the card holder includes necessary circuitry to convert electronical signals between receiving socket 503 and connector 504.

In one embodiment, in a PCIe configuration, each IO module has dedicated PCIe cable connectors that would allow connections with either external PCIe switch or directly with servers. The chassis itself may be designed entirely without switches. It is also possible to design the chassis with switches in order to connect multiple modules with certain amount of PCIe ports. For example, every 4 modules may be connected to two servers through a 6-port PCIe switch.

Since the IO cards directly correspond to the PCIe ports in switchless chassis design, disconnecting and connecting the PCIe cables may be used to alter the topology of the PCIe fabric. In comparison, a chassis with switch would have the PCIe fabric topology fixed by the chassis board design. Per PCIe standard, a PCIe slot within the module may be an x1, x4, x8, or x16 slot. The employed PCIe cable may be x4, x8. It is possible multiple PCIe ports (e.g., 1, 2, or 4) are used for each IO module. In the case of multiple ports per module the PCIe device may have its PCIe port bifurcated or quad-furcated into 2 or 4 ports internally.

The net effect is by changing the configuration for the PCIe ports and cables, a PCIe device may work as a single port endpoint with no bifurcation, multi-port endpoint where multiple ports appear as separate endpoints, a private gateway where some ports appear as endpoint while others are directly connected to other devices as a upstream device, or a standard PCIe switch. In some cases, topology changes can even be modified without moving the cables. In short, fabric topology that maybe advantageous to certain workload maybe configured more dynamically by either moving the cables or reconfiguring the PCIe ports on the devices. When multiple modules are connected internally or externally (of the chassis) to a PCIe switch, they can be configured and assigned individually or in a group to multiple servers connected to the same switch (through a PCIe fabric or directly) without rebooting the servers or moving the cables.

Referring now to FIG. 5B, IO card 501 includes a PCB 511 mounted to a mounting plate 512, where PCB 511 includes sufficient circuitry to mount or solder an IO device or chip such as a FPGA and/or a switch (e.g., PCIe switch) thereon. PCB 511 further includes an array of contacts 513 configured in a form factor compatible with the pin configuration of receiving socket 503 of card holder 502. In one embodiment, card holder 502 includes an L-shape metal frame having a horizontal section or horizontal plate 521 and a vertical section or vertical plate 522. Card holder 502 further includes PCB 530 mounted on electrically non-conductive stands 532 of horizontal plate 521 to prevent short circuit. Receiving socket 503 is mounted or soldered on PCB 530. PCB 530 includes necessary circuitry to convert electrical signals between socket 503 and connector 504 according to a signaling protocol associated with IO card 501. Socket 503 can receive a PCIe device with one PCIe lane (x1), 2 PCIe lanes (x2), 4 PCIe lanes (x4), 8 PCIe lanes (x8) or 16 PCIe lanes (x16).

When IO card 501 is held by card holder 502, contacts 513 are inserted into socket 503 and mounting plate 512 is fixedly mounted and tightened onto plate 522 using screw 528. Plate 522 further includes a handle 525 disposed on the top to allow a user to push and pull the IO modules in and out of the chassis. Card holder 502 further includes a holder board 541 mounted on plate 525 and plate 521 to provide support of the L-shape frame. Holder board 541 further includes a separator 542 (made of electrically non-conductive material such as rubber) mounted thereon to separate holder board 541 from PCB 511 to avoid short circuit. As shown in FIG. 4B, IO card 501 is inserted into and removed from socket 503 of card holder 502 vertically, while IO module 500 having IO card 501 and card holder 502 attached to each other is inserted into or removed from an IO subsystem chassis horizontally.

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An input and output (IO) subsystem chassis, comprising:
   a plurality of IO modules;
   a housing having a frontend and a backend, the housing including a plurality of IO slots to receive the plurality of IO modules inserted from the frontend of the housing; and
   a baseboard disposed within the housing, the baseboard including a plurality of first connectors corresponding to the IO slots to receive and connect the plurality of IO modules, wherein each of the IO modules can be coupled to one of a plurality of servers via the backend panel using a cable,
   wherein each of the IO modules comprises
      an IO card having a peripheral device mounted thereon,
      a card holder including
         a printed circuit board (PCB),
         a first receiving socket disposed perpendicularly on a surface of the PCB to receive and hold the IO card plugged in vertically and downwardly with respect to the surface of the PCB and the baseboard,
         a second connector disposed on a backend edge of the PCB parallel with the surface of the PCB to engage with or disengage from a corresponding one of the first connectors of the baseboard horizontally with respect to the surface of the PCB and the baseboard, when the IO module is inserted into or removed from a corresponding IO slot from the frontend, without having to remove the housing, and
   wherein the IO subsystem chassis and a server chassis housing the plurality of servers are disposed within an electronic rack.

2. The IO subsystem chassis of claim 1, wherein the IO card is inserted into or removed from the first receiving socket of the card holder vertically, and wherein the IO module having the IO card and the card holder mounted therein is inserted into or removed from the baseboard horizontally via the frontend of the housing and without removing the housing.

3. The IO subsystem chassis of claim 1, wherein the PCB includes circuitry to convert electrical signals between the first receiving socket and the second connector according to a signaling protocol associated with the peripheral device.

4. The IO subsystem chassis of claim 3, wherein the card holder further comprises an L-shape metal frame having a vertical section and a horizontal section, wherein the PCB having the first receiving socket mounted thereon is mounted onto the horizontal section, and wherein the IO card is inserted into the first receiving socket of the horizontal section and mounted onto the vertical section of the L-shape frame.

5. The IO subsystem chassis of claim 4, wherein the card holder further comprises a holder board mounted on the vertical section of the L-shape metal frame to provide protection to the IO card.

6. The IO subsystem chassis of claim 4, wherein the card holder further comprises a plurality of non-conductive stands disposed between the PCB and the horizontal section of the L-shape metal frame, such that the PCB is mounted onto the horizontal section of the L-shape metal frame without short circuit.

7. The IO subsystem chassis of claim 1, wherein the baseboard further includes a plurality of third connectors corresponding to the plurality of first connectors, and wherein each of the third connectors is capable of receiving a cable to connect a corresponding IO module to one of a plurality of server blades of a server chassis representing the plurality of servers.

8. The IO subsystem chassis of claim 7, wherein the baseboard further includes a printed circuit board (PCB) having circuitry to convert electrical signals between the first connectors and the third connectors according to a signaling protocol associated with the peripheral devices mounted on the IO cards.

9. The IO subsystem chassis of claim 7, further comprising one or more cooling fans mounted on the backend of the housing to provide cooling to the IO modules inserted into the hosing.

10. The IO subsystem chassis of claim 9, wherein the baseboard is mounted on a bottom of the housing in a horizontal orientation while the IO modules are positioned vertically within the housing, such that the baseboard does not significantly block a cooling air flow provided by the cooling fans.

11. The IO subsystem chassis of claim 7, wherein the housing further comprises a cable runway extended between the backend and frontend of the housing, wherein the cable runway allows a plurality of cables coupled to the third connectors of the baseboard to reach the frontend of the housing in order to connect with the server blades of the server chassis from the frontend of the housing.

12. The IO subsystem chassis of claim 11, wherein the IO subsystem chassis and the server chassis are mounted within an electronic rack, and wherein one or more of the IO modules can be coupled to any one of the server blades using a cable extended from the baseboard.

13. The IO subsystem chassis of claim 1, wherein a peripheral device of each IO card comprises a peripheral component interface (PCI) express (PCIe) compatible device, wherein each of the server blades includes at least one of a PCIe hub device or a PCTe root complex device to allow one or more PCIe compatible devices of the IO modules to be coupled to the server blade.

14. The IO subsystem chassis of claim 13, wherein the first receiving socket is compatible with a PCIe specification with at least one of 1 PCIe lane, 4 PCIe lanes, 8 PCIe lanes, or 16 PCIe lanes.

15. An electronic rack, comprising:
a server chassis having a plurality of server blades, each server blade including one or more processors and a memory, wherein each server blade represents a server; and
an input and output (IO) subsystem chassis, wherein the IO subsystem chassis comprises
a plurality of IO modules,
a housing having a frontend and a backend, the housing including a plurality of IO slots to receive the plurality of IO modules inserted from the frontend of the housing, and
a baseboard disposed within the housing, the baseboard including a plurality of first connectors corresponding to the IO slots to receive and connect the plurality of IO modules, wherein each of the IO modules can be coupled one of the server blades of the server chassis via the backend panel using a cable,
wherein each of the IO modules comprises
an IO card having a peripheral device mounted thereon, and
a card holder including
a printed circuit board (PCB),
a first receiving socket disposed perpendicularly on a surface of the PCB to receive and hold the IO card plugged in vertically and downwardly with respect to the surface of the PCB and the baseboard,
a second connector disposed on a backend edge of the PCB parallel with the surface of the PCB to engage with or disengage from a corresponding one of the first connectors of the baseboard horizontally with respect to the surface of the PCB and the baseboard, when the IO module is inserted into or removed from a corresponding IO slot from the frontend, without having to remove the housing.

16. The electronic rack of claim 15, wherein the IO card is inserted into or removed from the first receiving socket of the card holder vertically, and wherein the IO module having the IO card and the card holder mounted therein is inserted into or removed from the baseboard horizontally via the frontend of the housing and without removing the housing.

17. The electronic rack of claim 15, wherein the PCB includes circuitry to convert electrical signals between the first receiving socket and the second connector according to a signaling protocol associated with the peripheral device.

18. The electronic rack of claim 17, wherein the card holder further comprises an L-shape metal frame having a vertical section and a horizontal section, wherein the PCB having the first receiving socket mounted thereon is mounted onto the horizontal section, and wherein the IO card is inserted into the first receiving socket of the horizontal section and mounted onto the vertical section of the L-shape frame.

19. The electronic rack of claim 18, wherein the card holder further comprises a holder board mounted on the vertical section of the L-shape metal frame to provide protection to the IO card.

20. The electronic rack of claim 18, wherein the card holder further comprises a plurality of non-conductive stands disposed between the PCB and the horizontal section of the L-shape metal frame, such that the PCB is mounted onto the horizontal section of the L-shape metal frame without short circuit.

21. The electronic rack of claim 15, wherein the baseboard further includes a plurality of third connectors corresponding to the plurality of first connectors, and wherein each of the third connectors is capable of receiving a cable to connect a corresponding IO module to one of the server blades of the server chassis representing a plurality of servers.

22. The electronic rack of claim 21, wherein the baseboard further includes a printed circuit board (PCB) having circuitry to convert electrical signals between the first connectors and the third connectors according to a signaling protocol associated with the peripheral devices mounted on the IO cards.

23. The electronic rack of claim 21, wherein the IO subsystem chassis further comprises one or more cooling fans mounted on the backend of the housing to provide cooling to the IO modules inserted into the hosing.

24. The electronic rack of claim 23, wherein the baseboard is mounted on a bottom of the housing in a horizontal orientation while the IO modules are positioned vertically within the housing, such that the baseboard does not significantly block a cooling air flow provided by the cooling fans.

25. The electronic rack of claim 21, wherein the housing further comprises a cable runway extended between the backend and frontend of the housing, wherein the cable runway allows a plurality of cables coupled to the third connectors of the baseboard to reach the frontend of the housing in order to connect with the server blades of the server chassis from the frontend of the housing.

26. The electronic rack of claim 25, wherein the IO subsystem chassis and the server chassis are mounted within an electronic rack, and wherein one or more of the IO modules can be coupled to any one of the server blades using a cable extended from the baseboard.

27. An input and output (IO) module to be inserted into an IO subsystem chassis, the IO module comprising:
an IO card having a peripheral device mounted thereon; and
a card holder including
a printed circuit board (PCB),
a first connector disposed perpendicularly on a surface of the PCB as a receiving socket to receive and hold the IO card plugged in vertically and downwardly with respect to the surface of the PCB and the baseboard, and
a second connector disposed on a backend edge of the PCB parallel with the surface of the PCB to horizontally with respect to the surface of the PCB and the baseboard, engage with or disengage from a third connector disposed on a baseboard of an IO subsystem chassis, when the IO module is inserted into or removed from one of a plurality of IO slots from a frontend of the IO subsystem chassis, without having to remove a housing that houses a plurality of IO modules therein,
wherein the IO subsystem chassis is disposed within an electronic rack having a server chassis coupled to the IO modules of the IO subsystem chassis using cables, wherein the sever chassis includes a plurality of server blades, each representing a server, and
wherein the IO module is one of a plurality of IO modules each coupled to one of the plurality of server blades.

28. The IO module of claim 27, wherein the IO card is inserted into or removed from the first receiving socket of the card holder vertically, and wherein the IO module having the IO card and the card holder mounted therein is inserted into or removed from the baseboard horizontally via the frontend of the housing and without removing the housing of the IO subsystem chassis.

29. The IO module of claim 27, wherein the PCB includes circuitry to convert electrical signals between the first connector socket and the second connector according to a signaling protocol associated with the peripheral device.

30. The IO module of claim 29, wherein the card holder further comprises an L-shape metal frame having a vertical section and a horizontal section, wherein the PCB having the first receiving socket mounted thereon is mounted onto the horizontal section, and wherein the IO card is inserted into the first receiving socket of the horizontal section and mounted onto the vertical section of the L-shape frame.

31. The IO module of claim 30, wherein the card holder further comprises a holder board mounted on the vertical section of the L-shape metal frame to provide protection to the IO card.

32. The IO module of claim 30, wherein the card holder further comprises a plurality of non-conductive stands disposed between the PCB and the horizontal section of the L-shape metal frame, such that the PCB is mounted onto the horizontal section of the L-shape metal frame without short circuit.

* * * * *